United States Patent [19]

Kurt

[11] Patent Number: 4,953,640
[45] Date of Patent: Sep. 4, 1990

[54] QUICK DETACH BIT

[76] Inventor: Ewald H. Kurt, 2933 Rosalind Ave., Roanoke, Va. 24014

[21] Appl. No.: 395,997

[22] Filed: Aug. 21, 1989

[51] Int. Cl.⁵ .................... E21B 17/046; E21B 17/06; F16D 1/10; F16L 37/00
[52] U.S. Cl. .................................... 175/320; 175/327; 279/24; 279/77; 279/79; 279/93; 285/39; 285/308; 403/20; 403/321; 403/377; 408/1 BD
[58] Field of Search ............... 175/320, 321, 327, 415, 175/424; 403/19, 20, 321, 322, 359, 361, 377; 408/1 BD; 285/39, 308, 321; 279/20, 24, 28, 29, 76, 77, 79, 93

[56] References Cited

U.S. PATENT DOCUMENTS

| | | |
|---|---|---|
| 1,387,493 | 8/1921 | Keller et al. |
| 1,603,217 | 10/1926 | Shaff . |
| 1,910,275 | 5/1933 | Alden .................................. 279/77 |
| 2,037,307 | 4/1936 | Bowman ........................... 403/377 |
| 2,089,166 | 8/1937 | Reichhardt .......................... 279/79 |
| 2,117,746 | 5/1938 | Seawright . |
| 2,215,015 | 9/1940 | Richard ............................... 279/79 |
| 2,282,149 | 5/1942 | Allen . |
| 2,817,535 | 12/1957 | Linzell . |
| 2,954,994 | 10/1960 | Beers ................................... 403/20 |
| 3,011,794 | 12/1961 | Vaughn ............................... 279/93 |
| 3,517,953 | 6/1970 | Wright et al. ..................... 403/359 |
| 3,608,936 | 9/1971 | Karden .............................. 403/322 |
| 3,890,051 | 6/1975 | Biek ..................................... 403/20 |
| 4,251,084 | 2/1981 | Franklin . |
| 4,706,764 | 11/1987 | Hughes ............................... 175/415 |
| 4,836,306 | 6/1989 | Barrows .............................. 175/415 |

Primary Examiner—Bruce M. Kisliuk
Attorney, Agent, or Firm—J. R. Bell

[57] ABSTRACT

A quick detach bit apparatus includes a wear sleeve having a chuck threaded thereinto. A bit is mounted within the chuck. The bit and chuck are interconnected by mating, axially extending splines and grooves. The chuck includes a resiliently mounted segment urged into engagement with the bit. A quick release tool is accommodated in a passage between the bit and chuck. The tool is inserted into the passage and has a thickness sufficient to urge the segment out of engagement with the bit so that the bit is removed from the chuck.

14 Claims, 2 Drawing Sheets

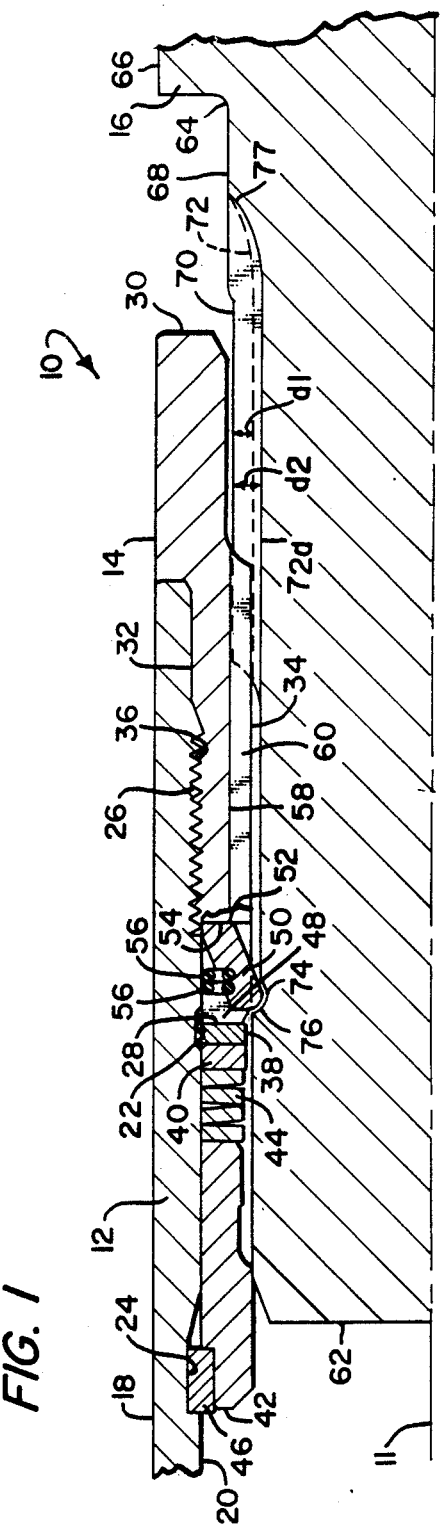
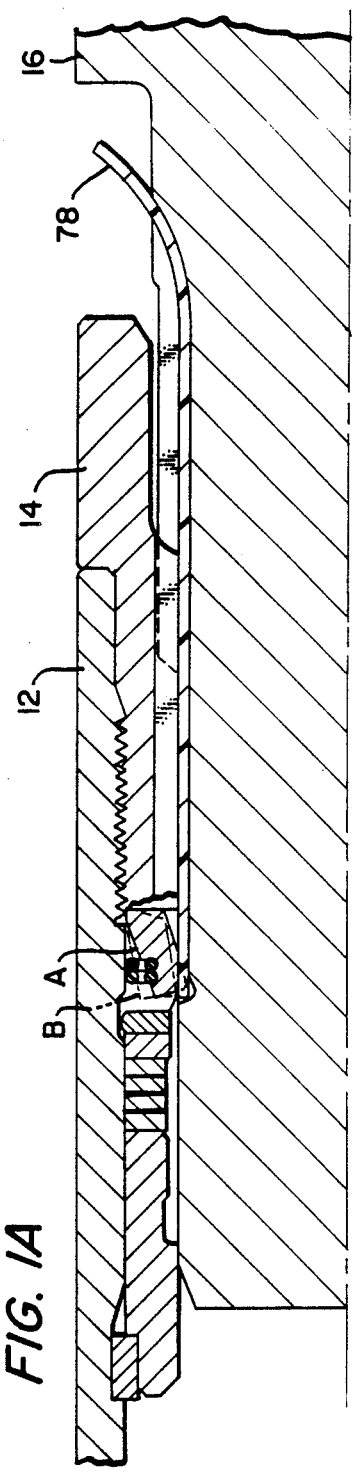
FIG. I
FIG. IA

QUICK DETACH BIT

BACKGROUND OF THE INVENTION

This invention relates generally to chucks having self-grasping, spreadable elements and more particularly to a quick detach bit for earth drilling operations.

In earth-type drilling apparatus, it is often required to replace a drill bit due to wear or breakage. Under ordinary conditions, i.e. where a bit is worn out and requires replacement, the bit is tightly gripped and the chuck is unscrewed from the wear sleeve, often with great difficulty, and the bit is then removed from the chuck. In the situation where a bit has broken there may not be a sufficient amount of the bit exposed for gripping so that the chuck can be unscrewed. In this situation a metal bar may be welded to a remaining portion of the bit to provide a sufficient amount of grip to unscrew the chuck. Either operation requires an undesirable amount of time.

Where cluster drills are being used, the bit changing operation requires even more time. The drill must first be removed from the cluster and then the bit is removed from the drill.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a quick detach bit apparatus including a bit having an outer circumferential surface including a plurality of alternating, substantially axially extending splines and grooves formed in the surface. A means for accommodating a quick release tool is provided and includes a tool access groove formed in and substantially axially extending along the surface. In this manner, the tool is permitted to be moved along the length of the tool access groove.

The foregoing and other aspects will become apparent from the following detailed description of the invention when considered in conjunction with the accompanying drawing figures. It is to be expressly understood, however, that the drawing figures are not intended as a definition of the invention but are for the purpose of illustration only.

BRIEF DESCRIPTION OF THE DRAWING FIGURES

FIG. 1 is a partial, cross-sectional side view illustrating an embodiment of the quick detach feature of the present invention;

FIG. 1a is a partial cross-sectional side view illustrating the quick release tool moving the segment to a dotted line release position;

DETAILED DESCRIPTION

Figure 2:
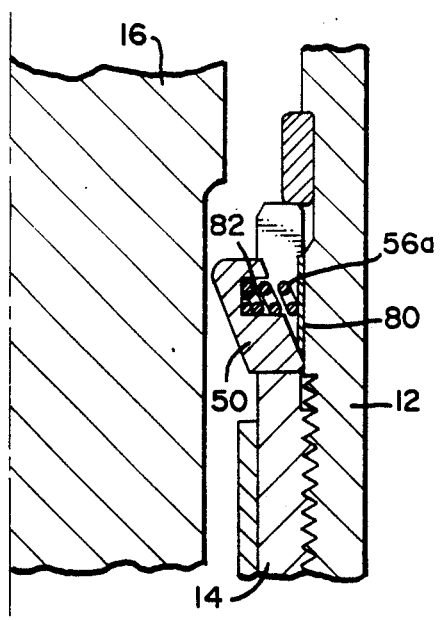
FIG. 2 is a partial, cross-sectional side view of another embodiment of the present invention.

Referring now to the drawing figures, a quick detach bit apparatus is generally designated 10 in FIG. 1. The apparatus 10 is partially illustrated along a centerline 11 and includes a wear sleeve 12, a chuck 14 and a bit 16.

Wear sleeve 12 has an outer circumferential surface 18 and an inner circumferential surface 20 which includes annular retainer grooves 22, 24 and a threaded portion 26.

Chuck 14 has a first end 28, a second end 30, an outer circumferential surface 32 and an inner circumferential surface 34. Outer circumferential surface 32 includes a threaded portion 36 for threaded engagement with threaded portion 26 of wear sleeve 12.

First end 28 of chuck 14 is threadedly urged against a retainer ring 38 extending into retainer groove 22. Retainer 38 abuts a spacer 40 separated from an upper bearing 42 by a plurality of compressed belville washers 44. Upper bearing 42 is retained by a retainer ring 46 extending into retainer groove 24.

First end 28 of chuck 14 includes at least one recessed portion 48 formed therein. Preferably, however, a pair of diametrically opposed recessed portions are provided. A segment 50 is provided to seat in each recessed portion 48. Segment 50 includes an angled surface 52 seated against a base 54 of recessed portion 48 so that segment 50 is seated to angularly extend inwardly of the inner surface 34. A pair of resilient "O" rings 56 are in tensioned engagement with chuck 14 adjacent first end 28 thus engaging segment 50 to urge segment 50 inwardly of inner surface 34.

Inner surface 34 of chuck 14 includes a plurality of alternating splines 58 and grooves 60 formed therein. Such splines 58 and grooves 60 are well known and extend substantially axially along inner surface 34.

Bit 16 has a first end 62 and a second end 64 including a head portion 66 which is partially shown. An outer circumferential surface 68 of bit 16 also includes a plurality of alternating splines 70 and grooves 72 formed therein for mating engagement with the splines 58 and grooves 60 of chuck 14. The splines 70 and grooves 72 of bit 16 are also well known and extend substantially along outer surface 68.

A first end 74 of grooves 72 terminate in a flange 76 which engages resiliently urged segment 50 of chuck 14 and limits removal of bit 16 from chuck 14. A second end 77 of grooves 72 are rounded to intersect outer surface 68.

Figure 4:
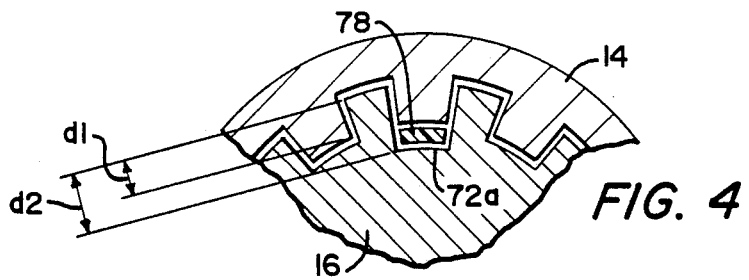
FIG. 4 is a partial, cross-sectional end view illustrating the quick release tool in the tool access groove.

The grooves 72 have a first depth d1, see FIG. 4. At least one of the grooves has a second depth d2, greater than the first depth d1. The greater depth provides a tool access groove 72a which is provided to permit a quick release tool 78 to move axially along groove 72a. Tool 78 may be formed of any suitable metallic or synthetic material and has a thickness sufficient to urge segment 50 out of engagement with flange 76 of bit 16. Tool 78 must be flexible to conform to the shape of groove 72a and have sufficient stiffness to be pushed along groove 72a.

In the preferred embodiment, with the diametrically opposed segments 50, a pair of diametrically opposed tool access grooves 72a will be required to permit a tool to be moved, simultaneously, through each groove for simultaneous movement of the opposed segments 50 from a solid line position A to a dotted line position B, best illustrated in FIG. 1a.

Figure 3:
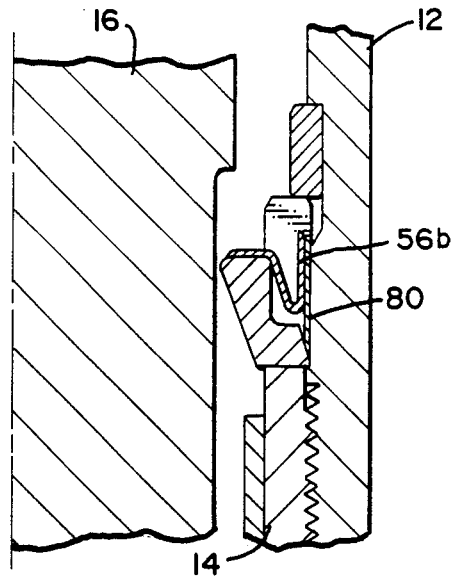
FIG. 3 is a partial, cross-sectional side view of a further embodiment of the present invention.

FIG. 2 illustrates the use of a compression spring 56a as an alternative resilient means for urging segment 50 into an engagement position with bit 16. Spring 56a is compressed between a retainer 80 and a recess 82 formed in segment 50. FIG. 3 illustrates a leaf spring 56b as another alternative resilient means. Leaf spring 56b also functions cooperatively with retainer 80.

It is recognized that a tool access groove may be provided in many ways such as by decreasing the height or width of a spline, increasing the depth or width of a groove, eliminating a spline, or providing a groove within a spline. Such alternatives become apparent from FIG. 4 wherein grooves 72 having the depth d1, include a tool access groove 72a having the depth d2, thus providing access for tool 78.

Cluster drill bits have grooves provided therein for exhaust air. Such grooves can be modified for accommodating a quick release tool. The segments can be provided as set forth above or can be provided in modified embodiments.

In operation, bit 16 is easily inserted into chuck 14 until bit 16 is in a position within chuck 14 wherein segment 50 is urged into engagement with flange 76. When removal is desired, quick release tool 78 is inserted in tool access path 72a whereby tool 78 urges segment 50 from position A to position B out of engagement with flange 76, thus permitting removal of bit 16 from chuck 14.

While this invention has been illustrated and described in accordance with a preferred embodiment, it is recognized that variations and changes may be made therein without departing from the invention as set forth in the claims.

What is claimed is:

1. A quick detach bit apparatus, comprising:
   a bit having an outer circumferential surface;
   a plurality of alternating, substantially axially extending splines and grooves formed in the surface;
   means for accommodating a quick release tool, said means being a tool access groove substantially axially extending along the outer circumferential surface in one of the said splines and grooves, the depth of said tool access groove being greater than the depth of said other grooves, whereby the tool is permitted to be moved axially along the tool access groove.

2. A quick detach bit apparatus, comprising:
   a chuck having an inner circumferential surface;
   bit means having an outer circumferential surface for mating engagement with the inner surface of the chuck;
   means for releasably interconnecting the bit and the chuck; and
   means for accommodating a quick release tool, said means being a tool access groove formed in and substantially axially extending along one of the inner and outer surfaces, said tool access groove being of a depth sufficient to permit the tool to be moved axially along the tool access groove for engaging the means for releasably interconnecting the bit and the chuck.

3. The bit as defined in claim 2, wherein the outer circumferential surface includes a plurality of alternating, substantially axially extending splines and grooves formed therein.

4. The bit as defined in claim 2, wherein the means for releasably interconnecting the bit and chuck includes at least one segment mounted in the chuck, said segment being resiliently urged into engagement with the bit.

5. The bit as defined in claim 4, wherein the tool has a thickness sufficient for urging the segment out of engagement with the bit.

6. A quick detach bit apparatus, comprising:
   a chuck having an inner circumferential surface;
   a bit having an outer circumferential surface in mating engagement with the inner surface of the chuck;
   means mounted on the chuck for releasably engaging the bit; and
   means for accommodating a quick release tool, said means being a tool access groove formed in and substantially axially extending along one of the inner and outer surfaces, said tool access groove being of a depth sufficient to permit the tool to be moved axially along the tool access groove for engaging the means for releasably engaging the bit.

7. The bit as defined in claim 6, wherein the outer circumferential surface includes a plurality of alternating, substantially axially extending splines and grooves formed therein.

8. The bit as defined in claim 6, wherein the means for releasably engaging the bit includes at least one segment mounted in the chuck, said segment being resiliently urged into engagement with the bit.

9. The bit as defined in claim 8, wherein the tool has a thickness sufficient for urging the segment out of engagement with the bit.

10. A quick detach apparatus according to claim 8, further comprising:
    at least one segment seated at one end of the chuck, the segment being seated to angularly extend inwardly of the inner surface; and
    means for resiliently mounting the segment with the chuck.

11. A quick detach bit apparatus, comprising:
    a wear sleeve,
    a chuck having an outer circumferential surface threadedly engaged with the wear sleeve, the chuck also having an inner circumferential surface including a plurality of alternating, substantially axially extending splines and grooves;
    a bit having an outer circumferential surface including a plurality of alternating, substantially axially extending splines and grooves matingly engaged with the splines and grooves of the chuck;
    means mounted on the chuck for releasably engaging the bit; and
    means for accommodating a quick release tool, said means being a tool access groove formed in and substantially extending along one of the inner chuck and outer bit surfaces, said tool access groove being of a depth greater than the other grooves in the bit, whereby the tool is permitted to be moved axially along the tool access groove for engaging the means for releasably engaging the bit.

12. The bit as defined in claim 11, wherein the means for releasably engaging the bit includes at least one segment mounted in the chuck, said segment being resiliently urged into engagement with the bit.

13. The bit as defined in claim 12, wherein the tool has a thickness sufficient for urging the segment out of engagement with the bit.

14. The bit as defined in claim 12, wherein the segment is seated at one end of the chuck, the segment being seated to angularly extend inwardly of the inner surface.

* * * * *